UNITED STATES PATENT OFFICE.

CARL OSKAR MÜLLER, OF BASLE, SWITZERLAND, ASSIGNOR TO THE BASLE CHEMICAL WORKS BINDSCHEDLER, OF SAME PLACE.

RHODOL DYE.

SPECIFICATION forming part of Letters Patent No. 596,333, dated December 28, 1897.

Application filed May 28, 1897. Serial No. 638,548. (Specimens.)

*To all whom it may concern:*

Be it known that I, CARL OSKAR MÜLLER, chemist, a subject of the King of Saxony, residing at Basle, Switzerland, have invented new and useful Improvements in the Manufacture of Dyestuffs of the Phtalein Series, of which the following is a clear and complete specification.

I have found that the dialkylamidoöxybenzoylbenzoic acids can be easily combined with resorcinol to form dyestuffs known as "rhodols," which in the form of their ethers dye wool, silk, and tannin-mordanted cotton of yellow-red tints.

The rhodol referred to herein is an intermediate body between rhodamin, which contain two amido groups, and fluorescein, in which the two amido groups of rhodamin are replaced by two hydroxyl groups, in rhodol one of the amido groups of rhodamin is replaced by a hydroxyl group. The probable formula of constitution of the hydrochlorid of ordinary or typical rhodol is—

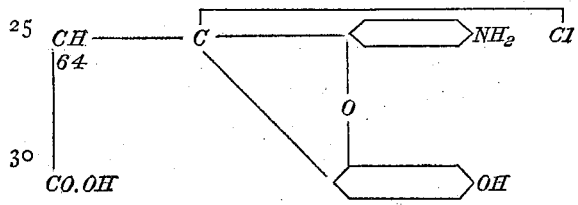

and the probable formula of constitution of hydrochlorid of dimethylrhodol to which this application more particularly relates is—

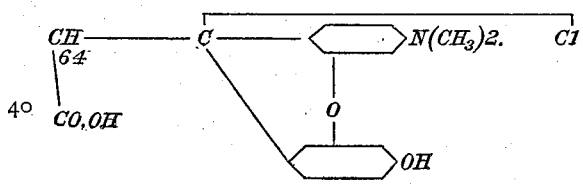

Example: Twenty-eight kilos of dimethylamidoöxybenzoylbenzoic acid are heated on the water-bath with fourteen kilos of resorcinol in one hundred and eighty kilos of monohydrated sulfuric acid and one hundred and eighty kilos of water until a sample no longer increases in intensity of color in warm water. The mixture is then poured into one thousand liters of water and heated for a longer time. After cooling the separated crystals are filtered and washed with water. By dissolving in alkali, precipitating, and recrystallizing from dilute alcohol the compound can be obtained pure. The dimethylrhodol hydrochlorid obtainable in this way forms beautiful hard crystals, which are sparingly soluble in cold water. In alcohol they dissolve with a yellow-red color. On the addition of ammonia a brilliant green fluorescence is developed. With alkalies the base forms salts soluble in water.

By etherifying agents the rhodol is converted into ethers. For this purpose thirty kilos of its hydrochlorid, for example, are heated for several hours in eighty kilos of alcohol and seventy-five kilos of monohydrated sulfuric acid until all is dissolved. The solution is poured into water, the base is precipitated and is converted into the hydrochlorid, which is purified by recrystallization from water containing hydrochloric acid. The ether in the form of its hydrochlorid dissolves in water with a yellow-red color. It differs from rhodol in the solubility of its hydrochlorid in water and in its incapacity to form with alkalies salts soluble in water. The base of the ether is soluble in alcohol and ether. Its alkaline alcoholic solutions fluoresce, showing a beautiful yellowish green. Strong sulfuric acid dissolves it with a yellow color. From dilute alchol it can be obtained in the form of hard crystals.

The diethyl products behave similarly to the dimethylrhodol and its ether, respectively, as described above.

What I claim as my invention, and wish to secure by Letters Patent, is—

1. The improvement in the manufacture of dyestuffs of the phtalein series which consists in condensing the dialkylamidoöxybenzoylbenzoic acids with resorcinol, as described.

2. The improvement in the manufacture of dyestuffs of the phtalein series, which consists in condensing the dialkylamidoöxybenzoylbenzoic acids with resorcinol and in converting the dyestuffs thus obtained into derivatives soluble in water by treating them with an alcohol and an acid, as described.

3. As a new article of manufacture the herein-described dyestuff, which is formed by the hydrochlorid of an alkyl ether of dimethyl rhodol, dissolving in water with a yellow-red color and dyeing wool, silk and tannin-mordanted cotton of yellow-red tints, and which in the form of its base is soluble in alcohol and ether, dissolves in concentrated sulfuric acid with a yellow color and gives alkaline alcoholic solutions having a beautiful yellowish-green fluorescence.

In witness whereof I have hereunto signed my name in the presence of two subscribing witnesses.

CARL OSKAR MÜLLER.

Witnesses:
AMAND RITTER,
GEORGE GIFFORD.